No. 748,737. PATENTED JAN. 5, 1904.
T. J. HUBBELL.
COMBINED CULTIVATOR, WEEDER, AND FURROW MAKER.
APPLICATION FILED JULY 14, 1902.
NO MODEL.

WITNESSES
Chas. L. Hyde.
M. L. Nickelson.

INVENTOR
Thomas J. Hubbell
by Hazard & Marpham
ATTORNEYS.

No. 748,737. Patented January 5, 1904.

UNITED STATES PATENT OFFICE.

THOMAS J. HUBBELL, OF LOS ANGELES, CALIFORNIA, ASSIGNOR OF THREE-ELEVENTHS TO H. C. NORRIS AND C. E. NORTON, OF LOS ANGELES, CALIFORNIA.

COMBINED CULTIVATOR, WEEDER, AND FURROW-MAKER.

SPECIFICATION forming part of Letters Patent No. 748,737, dated January 5, 1904.

Application filed July 14, 1902. Serial No. 115,569. (No model.)

*To all whom it may concern:*

Be it known that I, THOMAS J. HUBBELL, a citizen of the United States, residing at Los Angeles, in the county of Los Angeles and State of California, have invented a new and useful Sulky Beet-Cultivator, of which the following is a specification.

My invention consists in combining in one apparatus means to cultivate, to irrigate, and to weed beets, and more particularly sugar-beets, which are planted in rows from sixteen to eighteen inches apart, which cannot be cultivated with the ordinary cultivator. Special machinery must be made therefor; and the object of my invention is to provide an apparatus which by slight changes can be adapted to cultivate, weed, and make irrigating-furrows for large quantities of beets in a rapid, economical, and satisfactory manner and not to injure the plants in so doing. I accomplish this object by means of the apparatus herein described, and illustrated in the accompanying drawings, in which—

Figure 1:
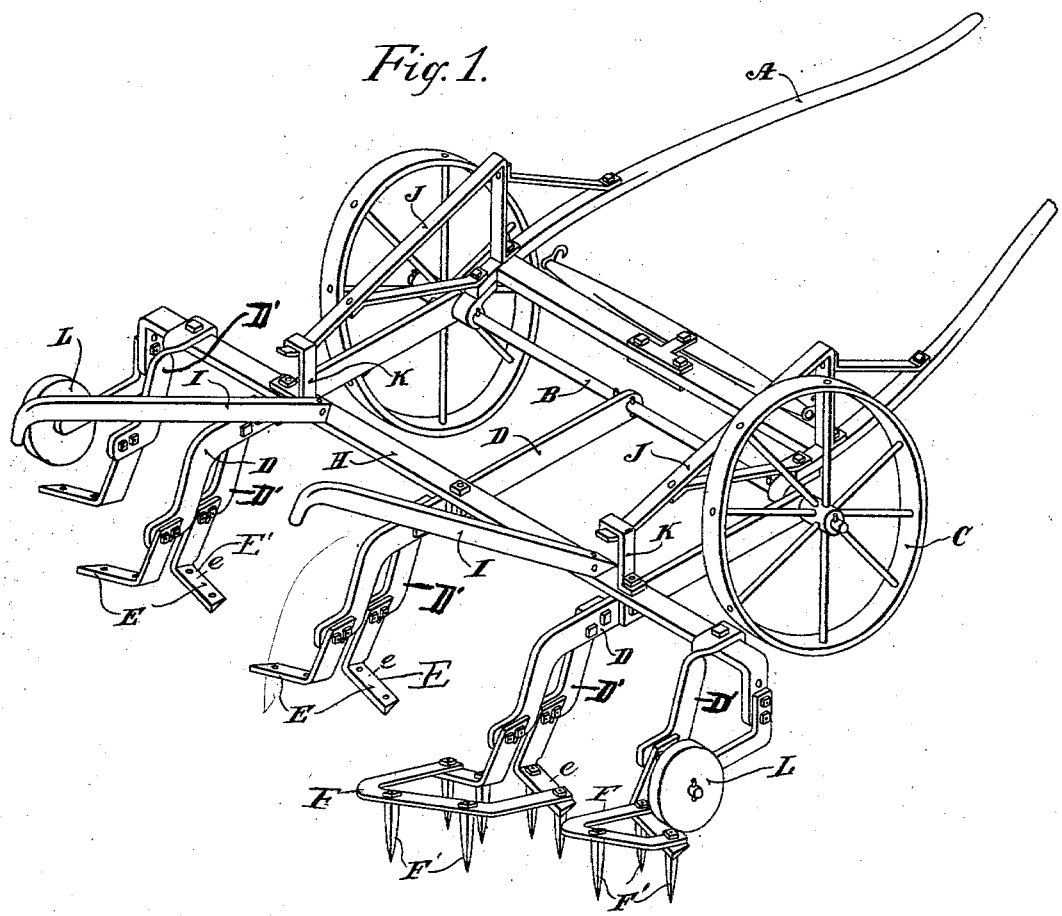
Figure 2:
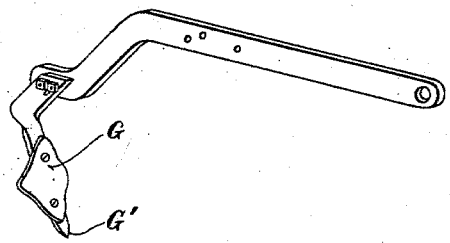

Figure 1 is a perspective view of a beet-cultivator embodying my invention. Fig. 2 is a perspective view of what I term a "furrow-maker" attached to the cutter-bar.

In the drawings, A represents the shafts, B the axle, and C the wheels, of the cultivator. From the axle, where they are pivotally attached in the front, extending rearwardly are three standards D, and to these standards, as well as to the steadying-bar hereinafter mentioned, are attached short attachment-holding bars D' D', which depend from the standards and steadying-bar, the free ends of all the attachment-holding bars and of the standards being perforated at their rear ends to afford means to interchangeably attach thereto, by means of bolts, the weed-cutter E when it is desired to cut the weeds between the rows of beets or to attach the harrow attachment F thereto when it is desired to cultivate the ground between the rows or to attach the furrow-maker G when it is desired to irrigate the beets by running water between the rows. The weed-cutter E is composed of two weed-cutting blades E E', bent in their center substantially at right angles forming two members, one having a sharpened edge e and arranged to lie horizontally when in place and another member, e', adapted to stand upright, the upright member being provided with bolt-holes for bolts to secure the same to the holding-bar D and the horizontal member being provided with bolt-holes for the reception of bolts to secure thereto the harrow attachment F, carrying the harrow-teeth F'. The furrow-maker has a downwardly-projecting point G' projecting below the furrow-maker plate to make in the bottom of the furrow a narrow ditch to carry the water down farther than it would be carried if the ditch were made by the furrow-maker plate, the object being to get this ditch deep to carry the water and not expend the amount of labor in doing so which would be necessary if the furrow-plate extended to the bottom of this ditch.

Running transversely across the cultivator in the rear of the axle is the steadying-bar H, to which each of the attaching-standards D are secured. Projecting upwardly from the steadying-bar are two hooks K to engage the rearwardly-projecting end of the carrying-bars J, which are attached to the shaft when it is desired to throw the cultivator out of operative position. Mounted on this steadying-bar are the handles I, projecting rearwardly therefrom. The cultivator is thrown out of operative position and into the position shown in Fig. 1, being the inoperative position, by raising the handles I I. This will elevate the steadying-bar, which will carry with it the hooks K, and when the hooks are above and clear of the carrying-bars J the steadying-bar is thrown to the left until the shank of the hooks K contacts with the carrying-bars, when the handles will be permitted to fall, throwing the hooks K over the carrying-bars and placing the cultivator into the inoperative position, as shown. The cultivator when it is being operated is thrown into the operative position when it has reached the point on the ground where it is to be put to work by a reversal of the above operation.

The adjusting-wheels L are revolubly mounted on bearings adjustably secured on the ends of the steadying-bar and provide suitable means to carry the rear end of the cultivator and also means to adjust the depth to which the implements then in the cultivator should penetrate the ground. These wheels are preferably on a line with the weed-cutters E, the ends of which extend not quite to the inner side of the wheel, so that if they run over any inequalities the weed-cutters will be kept at the proper position to cut the weeds and will not be too deep in the ground at one time and entirely out at another time, as would be the case if they were not on a line therewith.

The weed-cutter plates E are mounted so as to reach out in both directions from the standard and attachment-holding bar in the center on which they are mounted, the standards being so spaced apart on the steadying-bar as to come directly between the rows of the beets. This will cause the blades E' of the cutters E to cut all the weeds in the center between the rows and also the roots of the weeds in proximity to the rows and not disturb the plants. The same may be said of the other attachments—viz., the furrow-maker and the cultivator attachments each will be mounted to operate on space between the rows and not to interfere with the plants.

Having described my invention, what I claim as new, and desire to secure by Letters Patent, is—

In a cultivator, the combination with a plurality of standards and a steadying-bar secured to each standard, of auxiliary attachment-holding bars secured to the standards and to the steadying-bar, gage-wheels adjustably secured to the steadying-bar, weed-cutters detachably secured to the ends of the standards and attachment-holding bars, the gage-wheels on a line with the weed-cutters, handles secured to the steadying-bar and means for retaining the device out of operation.

In witness that I claim the foregoing I have hereunto subscribed my name this 3d day of July, 1902.

THOMAS J. HUBBELL.

Witnesses:
 M. C. NICKELESON,
 G. E. HARPHAM.